Oct. 21, 1958     K. H. N. SCHULPEN     2,856,974
DEVICE FOR CUTTING, SAWING OR SIMILARLY
SUB-DIVIDING MATERIAL

Filed Jan. 13, 1956     2 Sheets—Sheet 1

Inventor
Karel H. N. Schulpen
by
his attorneys

Oct. 21, 1958 K. H. N. SCHULPEN 2,856,974
DEVICE FOR CUTTING, SAWING OR SIMILARLY
SUB-DIVIDING MATERIAL
Filed Jan. 13, 1956 2 Sheets-Sheet 2
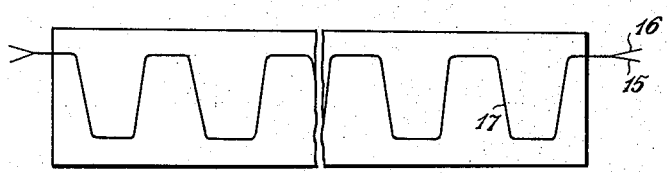
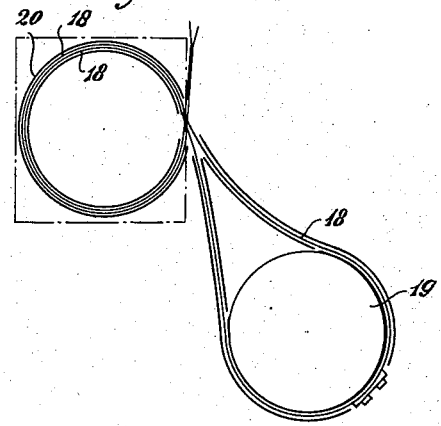
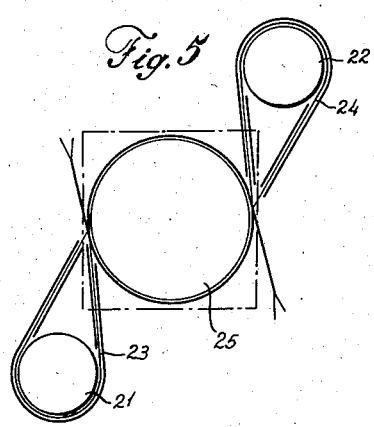
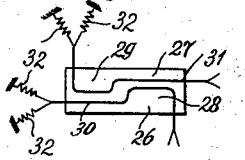

United States Patent Office 2,856,974
Patented Oct. 21, 1958

2,856,974

DEVICE FOR CUTTING, SAWING OR SIMILARLY SUBDIVIDING MATERIAL

Karel H. N. Schulpen, The Hague, Netherlands

Application January 13, 1956, Serial No. 559,032

Claims priority, application Netherlands January 20, 1955

2 Claims. (Cl. 143—60)

This invention relates to a device for the cutting, sawing or similarly subdividing of material.

When cutting foam material, such as foam plastic, foam rubber, sponge rubber etc. and when cutting textiles, wadding and other loose substances as well as clay, rusk loaves, cake and the like one is confronted by the difficulty that these materials cannot easily be cut in that they yield on being cut.

These difficulties occur particularly when it is necessary to cut objects having a predetermined profile, such as a profiled curve.

This invention aims at providing a device in which these difficulties are avoided. This is achieved by the device according to the invention in that it comprises at least two movable means adapted to be displaced in opposite directions relative to each other, of which at least one means is constructed as a cutting or subdividing means, these means being arranged so closely together that only one cut is formed. According to the invention the or each cutting means may be of arbitrary shape, for example it may be plate-, band- or thread-shaped. These means may be actuated by hand or mechanically in any known and suitable way and may thereby be given a reciprocating, circulating or rotating movement. It is also possible to arrange a plurality of sets of these means one beside the other so that a number of objects is simultaneously cut from one block of material.

For the purpose of cutting objects of any arbitrary shape it is necessary to provide guide means for the cutting means. The cutting means, which then consist of easily flexible material, are guided in the required direction or directions by said guide means. For cutting a certain profile the cutting means may be guided in such a manner that the desired profile is obtained with one guide means only. However, according to the invention it is also possible to have these means co-operate with two or more guide means.

The device according to the invention may be installed horizontally as well as vertically and it may also be mounted for upward and downward movement over or under a cutting table, etc. If required an arbitrary number of sets of cutting means and/or guide means may be accommodated in the installation so that consequently a great many objects may be cut simultaneously. It is also possible to arrange for the co-operation of devices arranged horizontally, vertically or in other directions.

The invention will be described below with reference to the drawings showing by way of example a simple embodiment and some applications of the device according to the invention.

Fig. 3 shows diagrammatically the cutting of foam plastic mattress stuffings.

Figs. 4 and 5 show two methods for cutting a round profile. For the sake of clearness the portions of the guiding means lying over one another have been left out.

Fig. 6 shows diagrammatically the cutting of draught excluders.

Figure 1:
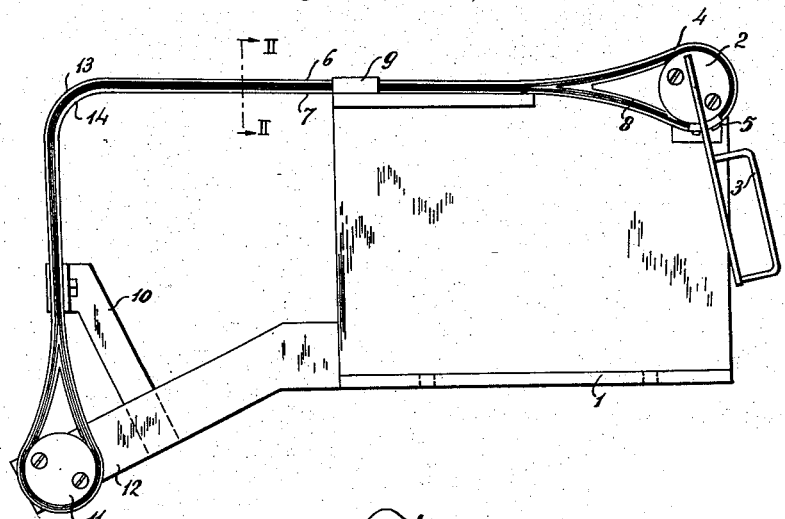
Fig. 1 shows a side-view of this device.
Figure 2:
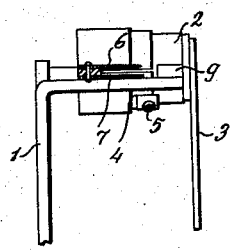
Fig. 2 shows a section according to the line II—II of Fig. 1.

The device shown in Figs. 1 and 2 comprises a frame 1 in which a roller 2 is mounted for reciprocating rotation. This roller is driven by means of the member 3 which may be constructed as a handle so that this device may be actuated by hand. The member 3 may also be in engagement with a crank or eccentric which may be driven for example by an electromotor. Around the roller 2 a bandshaped cutting means 4 has been laid which is firmly secured to this roller by means of a washer and bolts 5. The two band portions leaving said roller are moving between two guides 6, 7 firmly secured to the frame and closed at the rear. The ends of these guides facing the roller 2 are bent out in such a manner that the band shaped means 4 gradually enters into these guides. Between these bent-out guide portions a guide block 8 is provided which is also firmly secured to the frame 1. In order to prevent the band-shaped means 4 from leaving the guides 6 and 7 a retaining block 9 is provided in front of these guides. If required such a retaining block may be provided at the end of the guides 6 and 7 where these guides are secured to the frame 1 by means of a bracket 10.

The portions of the band-shaped means guided by the guides 6 and 7 are lying against each other. Up to a short distance from the retaining block 9 both portions are provided with sharp cutting edges projecting beyond the guides. If required these cutting edges may have teeth. If a band-shaped means 4 with ends is used, these ends may terminate inside or outside the guides 6 and 7. However, it is also possible, as shown in the drawings, to fasten these ends to a freely rotatable roller 11 supported by a bracket 12 of the frame. In this case also an endless band-shaped means may be used. When the band-shaped means is fastened to a roller 11, the guides for the non-cutting portion of the cutting means may be left out, because during the reciprocating movement of the band-shaped means 4 one part is each time kept taut by the roller 2 and the other part by the roller 11, the part driven each time by the roller 2 rotating the roller 11.

The above-described device operates as follows:

When the member 3 is actuated, for example by hand or by a crank, the roller 2 is given a reciprocating movement which is transmitted to the parts located between the guides 6 and 7. When it is necessary to cut for example elastic multicellular foam material with the device according to the invention, substantially equal forces will be exerted in opposite directions on every portion of this material at the point of the cut to be made, so that consequently this material does not get the tendency to move to and fro and a smooth cut is made. Due to the fact that the parts provided with cutting edges are lying closely together only one cut is made by both parts of the band-shaped means 4 provided with cutting edges. When using the device shown in the drawing it is possible to cut for example objects with a rounded-off corner corresponding to the rounding-off 13, 14 of the guides 6 and 7.

It is obvious that any desired profile may be cut with the device according to the invention. For that purpose one only needs to construct the guide according to shape of the cut to be made and, if required, more than one set of co-operating cutting and/or supporting means may be used.

Fig. 3 shows diagrammatically a cutting device for mattress stuffings of elastic multicellular foam material, in which two mattress stuffings are cut simultaneously from one block of such material without any production of waste material. The guides with the cutting means parts 15, 16 located therein between are indicated by reference number 17. Also in this case the cutting means may be constructed as an endless band which is either continuously driven or given a reciprocating movement. For simplicity's sake the portions of the guide and of the cutting means situated in the block of material have been drawn in one single line.

Fig. 4 shows a device for cutting cylindrical parts. In this case a band-shaped means 18 is fastened with its ends to a roller 19 adapted to rotate in a reciprocating way. The two parts are guided by a helical guide 20, in the neighborhood of the workpiece, shown in dotted lines, so that when the parts make a complete loop, the end of the loop will pass over the first part. When the roller 19 is given a reciprocating rotation, the cutting parts move to and fro in the guide 20 so that consequently cylindrical parts are cut from a block of material having an arbitrary cross-section.

Fig. 5 shows a device in which two rollers 21, 22 adapted for reciprocating rotation are used, a cutting means 23, respectively 24 with ends being fastened to each of these rollers. Of these cutting means the parts provided with cutting edges and the guides co-operating therewith are each approximately semi-circular so that by means of this device also a cylinder 25 is cut.

Fig. 6 shows the cutting parts of the band-shaped cutting means and their guides for a device for cutting two draught excluders 26, 27 consisting of a flat portion with a raised portion 28 and 29 respectively. In this case two groups of adjacent cutting means with guides 30, 31 are provided. The cutting means may be given a reciprocating movement or may circulate. In this figure the coinciding parts of the cutting means and of the guides are again indicated by one single line for simplicity's sake.

It is obvious that the invention is not restricted to the embodiment described above by means of example but that these may be modified in many ways or adapted to the shape of the object to be cut without departing from the scope of the invention.

I claim:

1. A device for cutting yieldable material comprising a frame, a cutting means carried by the frame and consisting of at least two movable substantially parallel thin bendable band portions, at least one of the band portions having a cutting edge, said band portions being mounted so closely together in the cutting area that during the cutting process said band portions move together through the material in a common kerf, driving means mounted on the frame for moving said band portions simultaneously in opposite directions and at least one rigid guiding means at the rear of said band portions for guiding said band portions, said guiding means having the shape of a profiled curve so that at the cutting place said band portions are deformed according to a line deviating from a straight line, said guiding means also being substantially the thickness of the kerf width and moving together with the band portions through the material.

2. A device according to claim 1, wherein the guiding means supports the band portions over their entire length.

References Cited in the file of this patent
UNITED STATES PATENTS

| | | |
|---|---|---|
| Re. 14,210 | Childs | Oct. 31, 1916 |
| 1,064,865 | Spielman | June 17, 1913 |
| 1,137,459 | Campbell | Apr. 27, 1915 |
| 1,553,672 | DeNorthall | Sept. 15, 1925 |
| 1,789,804 | Broillet | Jan. 20, 1931 |
| 2,517,901 | Luckenbach | Aug. 8, 1950 |
| 2,534,001 | Couse | Dec. 12, 1950 |
| 2,598,480 | Wright | May 27, 1952 |
| 2,684,530 | Weinberg | July 27, 1954 |